United States Patent
Spieler et al.

(10) Patent No.: US 8,712,082 B2
(45) Date of Patent: Apr. 29, 2014

(54) WIRELESS UPDATING OF HEARING DEVICES

(75) Inventors: Ivo Spieler, Kuesnacht (CH); Rino Eichmann, Ernetschwil (CH); Oliver Frank, Zurich (CH); Christoph Aerne, Bubikon (CH)

(73) Assignee: Phonak AG, Stafa (CH)

( * ) Notice: Subject to any disclaimer, the term of this patent is extended or adjusted under 35 U.S.C. 154(b) by 121 days.

(21) Appl. No.: 13/120,204

(22) PCT Filed: Sep. 26, 2008

(86) PCT No.: PCT/EP2008/062960
§ 371 (c)(1),
(2), (4) Date: Mar. 22, 2011

(87) PCT Pub. No.: WO2009/007468
PCT Pub. Date: Jan. 15, 2009

(65) Prior Publication Data
US 2011/0188684 A1    Aug. 4, 2011

(51) Int. Cl.
*H04R 25/00* (2006.01)
*H04R 29/00* (2006.01)

(52) U.S. Cl.
USPC ............ 381/315; 381/60; 381/314; 381/23.1; 381/312; 381/328; 381/330

(58) Field of Classification Search
CPC .. H04R 25/70; H04R 25/505; H04R 2225/41; H04R 25/558; H04R 25/554; H04R 25/30; A61B 5/121
USPC ........... 381/314, 315, 312, 328, 330, 60, 23.1
See application file for complete search history.

(56) References Cited

U.S. PATENT DOCUMENTS

| | | | | |
|---|---|---|---|---|
| 5,604,812 A | * | 2/1997 | Meyer | 381/314 |
| 5,748,084 A | * | 5/1998 | Isikoff | 340/568.1 |
| 5,923,013 A | * | 7/1999 | Suzuki et al. | 235/375 |
| 6,016,449 A | * | 1/2000 | Fischell et al. | 607/45 |

(Continued)

FOREIGN PATENT DOCUMENTS

| | | |
|---|---|---|
| EP | 0537026 A2 | 4/1993 |
| EP | 1705872 A1 | 9/2006 |
| WO | 02/35884 A2 | 5/2002 |
| WO | 2008/014454 A2 | 1/2008 |

OTHER PUBLICATIONS

International Search Report for PCT/EP2008/062960 dated Jun. 15, 2009.

*Primary Examiner* — Duc Nguyen
*Assistant Examiner* — Sean H Nguyen
(74) *Attorney, Agent, or Firm* — Pearne & Gordon LLP

(57) ABSTRACT

The method of manufacturing a firmware-updated programmable hearing device comprising at least one processor and a memory unit in which hearing device firmware is stored, comprises the step of executing an update application in said processor installing an updated version of at least a portion of the hearing device firmware in said memory unit. The system for updating the firmware of a programmable hearing device as described above comprises: an update apparatus comprising a communication interface for communication via a wireless communication link and a storage unit in which an update application is stored, which is designed to be executed in said processor installing an updated version of at least a portion of the hearing device firmware in said memory unit.

12 Claims, 2 Drawing Sheets

(56) References Cited

U.S. PATENT DOCUMENTS

| | | | |
|---|---|---|---|
| 6,137,889 A * | 10/2000 | Shennib et al. | 381/328 |
| 6,173,174 B1 * | 1/2001 | Jacobs | 455/411 |
| 6,851,048 B2 * | 2/2005 | Armitage | 713/1 |
| 6,888,948 B2 * | 5/2005 | Hagen et al. | 381/314 |
| 7,120,433 B2 * | 10/2006 | Gladwin et al. | 455/426.1 |
| 7,200,237 B2 | 4/2007 | Zhang et al. | |
| 7,498,953 B2 * | 3/2009 | Salser et al. | 340/870.02 |
| 7,580,755 B1 * | 8/2009 | Schwartz et al. | 607/60 |
| 7,639,822 B2 * | 12/2009 | Westergaard | 381/60 |
| 7,669,046 B2 * | 2/2010 | Yasuda | 713/2 |
| 7,778,432 B2 * | 8/2010 | Larsen | 381/315 |
| 7,787,647 B2 * | 8/2010 | Hagen et al. | 381/314 |
| 7,903,827 B1 * | 3/2011 | Lockwood et al. | 381/60 |
| 7,971,199 B1 * | 6/2011 | Chen | 717/168 |
| 8,090,402 B1 * | 1/2012 | Fujisaki | 455/556.1 |
| 8,111,999 B2 * | 2/2012 | Ekkizogloy et al. | 398/135 |
| 8,300,862 B2 * | 10/2012 | Newton et al. | 381/314 |
| 2001/0047448 A1 * | 11/2001 | Sueoka et al. | 711/4 |
| 2002/0010866 A1 * | 1/2002 | McCullough et al. | 713/201 |
| 2002/0099412 A1 * | 7/2002 | Fischell et al. | 607/3 |
| 2004/0006703 A1 * | 1/2004 | Kitani et al. | 713/193 |
| 2004/0208182 A1 * | 10/2004 | Boles et al. | 370/395.5 |
| 2005/0055595 A1 * | 3/2005 | Frazer et al. | 713/400 |
| 2005/0196002 A1 * | 9/2005 | Hagen et al. | 381/314 |
| 2005/0201574 A1 * | 9/2005 | Lenhardt | 381/151 |
| 2005/0246583 A1 * | 11/2005 | Robinson | 714/15 |
| 2005/0272417 A1 * | 12/2005 | Liu | 455/419 |
| 2006/0062412 A1 * | 3/2006 | Berg | 381/312 |
| 2006/0152899 A1 * | 7/2006 | Wang | 361/685 |
| 2006/0202859 A1 * | 9/2006 | Mastrototaro et al. | 340/870.07 |
| 2006/0285690 A1 * | 12/2006 | Jung | 380/237 |
| 2007/0150678 A1 * | 6/2007 | Tsukada | 711/162 |
| 2008/0037797 A1 * | 2/2008 | Goldstein et al. | 381/56 |
| 2008/0095387 A1 * | 4/2008 | Niederdrank et al. | 381/314 |
| 2008/0120029 A1 * | 5/2008 | Zelek et al. | 701/213 |
| 2008/0160937 A1 * | 7/2008 | Baker et al. | 455/127.5 |
| 2008/0168435 A1 * | 7/2008 | Tupman et al. | 717/173 |
| 2008/0172708 A1 * | 7/2008 | Perry et al. | 725/110 |
| 2008/0244553 A1 * | 10/2008 | Cromer et al. | 717/168 |
| 2008/0261529 A1 * | 10/2008 | Rosenblatt | 455/41.3 |
| 2008/0276182 A1 * | 11/2008 | Leow | 715/740 |
| 2008/0279560 A1 * | 11/2008 | Osawa et al. | 398/130 |
| 2008/0285467 A1 * | 11/2008 | Olgaard | 370/242 |
| 2009/0089842 A1 * | 4/2009 | Perry et al. | 725/78 |
| 2009/0094450 A1 * | 4/2009 | Krzyzanowski et al. | 713/100 |
| 2010/0050168 A1 * | 2/2010 | Sharonov | 717/173 |
| 2010/0067723 A1 * | 3/2010 | Bergmann et al. | 381/315 |
| 2010/0328320 A1 * | 12/2010 | Kerstna et al. | 345/501 |
| 2011/0053560 A1 * | 3/2011 | Jain et al. | 455/411 |
| 2011/0072424 A1 * | 3/2011 | Choi et al. | 717/174 |
| 2011/0269540 A1 * | 11/2011 | Gillo et al. | 463/31 |
| 2011/0276724 A1 * | 11/2011 | Mullis et al. | 710/8 |
| 2012/0051272 A1 * | 3/2012 | Jain et al. | 370/310 |
| 2013/0083862 A1 * | 4/2013 | Barsoum et al. | 375/261 |

* cited by examiner

WIRELESS UPDATING OF HEARING DEVICES

TECHNICAL FIELD

The invention relates to the field of hearing devices, and in particular to updating of hearing devices, more particularly to wireless updating of hearing devices. It relates to methods and apparatuses according to the opening clauses of the claims.

Under a hearing device, a device is understood, which is worn in or adjacent to an individual's ear with the object to improve the individual's acoustical perception. Such improvement may also be barring acoustic signals from being perceived in the sense of hearing protection for the individual. If the hearing device is tailored so as to improve the perception of a hearing impaired individual towards hearing perception of a "standard" individual, then we speak of a hearing-aid device. With respect to the application area, a hearing device may be applied behind the ear, in the ear, completely in the ear canal or may be implanted.

BACKGROUND OF THE INVENTION

Considering today's programmable digital hearing devices, it is desirable to be able to update the firmware of the hearing device from time to time, so as to implement technical improvements in the hearing device. Based on the definition of "firmware" provided by Wikipedia, we understand under firmware a computer program that is embedded in a hardware device, namely—in the present case—in a hearing device. As its name suggests, firmware is somewhere between hardware and software. Like software, it is a computer program which is executed by a processor such as a microprocessor or a microcontroller. But it is also tightly linked to a piece of hardware (the hearing device) and has little meaning outside of it. In fact, one can say that the firmware of a hearing device enables the hearing device hardware to actually function as a hearing device, using the present hearing device hardware.

The hearing device firmware shall not be confused with higher-level software or data usually present in a hearing device such as hearing programs describing specific audio processing algorithms or data describing the hearing loss of the hearing device user. Accordingly, a firmware update (also referred to as firmware upgrade) may not be confused with the adaptation of the hearing device's signal processing parameters to the user's hearing needs and preferences (often simply referred to as fitting of the hearing device).

Usually, a firmware update is carried out by a hearing device professional such as an audiologist. The hearing device user will visit the hearing device professional's office in which a computer is present in which an update application and an updated version of the hearing device firmware is stored. Plugging a plug into a socket of the hearing device, a wired connection between computer and hearing device will be provided. Executing the update application in the computer, the firmware of the hearing device will be updated via said wire by installing a new version (updated version) of the firmware in the hearing device; this is usually accomplished by copying the new version of the hearing device firmware into the hearing device and put it into an executable condition.

U.S. Pat. No. 7,200,237 B2 discloses a method and a system for remotely upgrading a hearing aid device. It is suggested to receive in a local client machine (such as the hearing device professional's computer), software resources from a remote server, via a public network, such as the internet. Using the client machine, the downloaded software is then installed in the hearing aid device to be upgraded. The main intention of U.S. Pat. No. 7,200,237 B2 is, to effect that there is no need to have many versions of the firmware stored in the client machine, only the currently needed firmware version is loaded from a remote server at the time when it is needed.

It is desirable to provide an alternative way of updating the firmware of a hearing device.

SUMMARY OF THE INVENTION

Therefore, one object of the invention is to create an alternative way of updating the firmware of a hearing device; in particular a way, which allows to update said firmware in a fully wireless way. It is an object of the invention to provide a corresponding method of manufacturing a firmware-updated programmable hearing device, a corresponding system for updating the firmware of a programmable hearing device, a corresponding hearing device, a corresponding computer program product, and a corresponding computer-readable medium.

Another object of the invention is to provide a way of updating the complete firmware of a hearing device, in particular also that portion of the firmware which is required for wireless communication between the hearing device and an external device, i.e. the basic wireless-communication-enabling data, further on also referred to "wireless firmware".

Another object of the invention is to provide a way of updating the firmware of a hearing device, which minimizes the required storage space (in particular in non-volatile memory) in the hearing device.

Another object of the invention is to provide a way of updating the firmware of a hearing device, which minimizes versioning issues, i.e. which does not lead to a considerable increase in the number of different firmware versions and firmware version combinations.

Another object of the invention is to provide a way of updating the firmware of a hearing device, which minimizes the number of tests that have to be carried out in order to verify the proper operation of all possible hardware, software and firmware combinations.

Another object of the invention is to provide a way of updating the firmware of a hearing device, which allows to implement improvements also of wireless functionalities.

Another object of the invention is to provide a way of updating the firmware of a hearing device, which makes it possible to use smaller hearing devices, in particular hearing devices, which comprise no socket or plug for electrically connecting the hearing device.

Further objects emerge from the description and embodiments below.

At least one of these objects is at least partially achieved by apparatuses and methods according to the patent claims.

The method of manufacturing a firmware-updated programmable hearing device comprising at least one processor and a memory unit in which hearing device firmware is stored comprises the step of a) executing an update application in said processor installing an updated version of at least a portion of the hearing device firmware in said memory unit.

This approach is distinctly different from approaches known in the art. In the art, an update application is executed in a device—typically a computer—external to the hearing device, and the hearing device is in a slave position, the external device/computer acting as the master. One consequence thereof is that, in the art, there has to be an operational connection between that external device and the hearing device during the whole process of updating. In case that that operational connection is a wireless connection, it would not be possible to update that portion of the firmware which is currently used for the communication via the wireless communication connection; accordingly, only an incomplete firmware update could be accomplished (leaving out the "wireless firmware"). Alternatively, one could think of ways to include the "wireless firmware" in the update in an update process controlled by an external device via a wireless link, but in a straight-forward approach to do so, it would be necessary to provide in the hearing device a large amount of storage space (in non-volatile memory) in order to be able to at least temporarily store both, the original and the new version of the complete firmware. Since space and therefore also storage space is very limited in hearing devices, it is undesirable to provide storage space in a hearing device which is unused during most of the time (basically except during a firmware update).

The invention allows circumvent all these problems in an elegant way. By providing that an update application runs in the processor of the hearing device, it is possible to dispense with operational connections of hearing device to the outside during the update process or during a portion thereof. Accordingly, also firmware portions such as wireless protocol stacks can be updated. And it is possible to accomplish this with only that storage space which is anyway provided in the hearing device.

Viewed from a particular point of view, the method according to the invention can be considered a method for updating a programmable hearing device.

Note that said portion of the hearing device firmware installed by said update application can be the whole firmware, but in many cases will be less than the whole firmware.

In one embodiment, said update application controls, which data are to be replaced in which place (in the memory unit) during said installation of said portion of the hearing device firmware mentioned in step a).

In one embodiment, said hearing device comprises a communication interface for communication via a wireless communication link, and said method comprises, before step a), the step of
  b) loading said update application into said hearing device via said wireless communication link.

In one embodiment, said update application is loaded into said memory unit.

In one embodiment, said method comprises, before step b), the step of
  b1) establishing said wireless communication link.

In one embodiment, said hearing device comprises a communication interface for communication via a wireless communication link, and said method comprises, before step a), the step of
  c) loading said updated version of said portion of the hearing device firmware into said hearing device via said wireless communication link.

In one embodiment, said updated version of said portion of the hearing device firmware is loaded into said memory unit.

In one embodiment, said method comprises, before step c), the step of
  c1) establishing said wireless communication link.

In one embodiment, said hearing device comprises a communication interface for communication via a wireless communication link, wherein said portion of the hearing device firmware comprises at least a portion of those data which are required for or related to said communication via said wireless communication link. Such basic wireless-communication-enabling data ("wireless firmware") can be or comprise a wireless protocol stack, i.e. the protocols defining the communication via said communication interface.

In one embodiment, the method comprises, before step a), the step of d) creating a copy of data stored in said memory unit in an external storage unit. This allows space in said memory unit to be freed. In the freed storage space, said updated version of said portion of the hearing device firmware and/or said update application can be stored. At a later point in time, the copied data can be restored again in the said memory unit (in said hearing device).

In one embodiment, said external storage unit is separate from said hearing device, e.g., in an update apparatus, in an update and/or fitting station, in a computer.

In one embodiment, said hearing device comprises a communication interface for communication via a wireless communication link, and said data to be stored in said external storage unit are transferred to said external storage unit via said wireless communication link.

In one embodiment, said data to be stored in said external storage unit comprise data required for operating the hearing device as a hearing device, in particular all such data.

In one embodiment, said data to be stored in said external storage unit comprise data which are neither required for carrying out step a) nor for carrying out step b), in particular all such data.

In one embodiment, said data to be stored in said external storage unit comprise at least one of
  user-specific data,
  hearing device-specific data,
  configuration data.

Said user-specific data can comprise, e.g., data descriptive of the hearing device user's hearing loss. Said hearing device-specific data can comprise, e.g., data descriptive of technical properties of a hearing device component such as a microphone or a loudspeaker (receiver). Said configuration data can comprise, e.g., data descriptive of hearing programs defining parameter settings for the signal processing in the hearing device.

Said data to be stored in said external storage unit can comprise firmware data, with or without the "wireless firmware" data.

Please note: Here and in other places of the present patent application, it is for reasons of simplicity referred to data by naming them ("firmware" or "user-specific data"), where it might be more precise to use a wording such as "data representative of . . . ".

In one embodiment, the method comprises, after step a), the step of
  e) loading at least a portion of said data stored in said external storage unit back into said memory unit.

In step e), at least a portion of said data stored in said external storage unit is restored in said memory unit. In one embodiment, all of those data are restored.

In one embodiment, said hearing device comprises a communication interface for communication via a wireless communication link, and said loading back of data into said memory unit is carried out via said wireless communication link.

In one embodiment, this loading back of data into said memory unit via said wireless communication link is accomplished using said updated version of said portion of the hearing device firmware. E.g., this reloading makes use of a new version of the wireless protocol stack.

In one embodiment, said hearing device comprises a communication interface for communication via a wireless communication link, and said portion of the hearing device firmware is less than the complete hearing device firmware and comprises at least a portion of those data which are required for or related to said communication via said wireless communication link ("wireless firmware"), and said method comprises, after step a), the step of f) establishing said wireless link using said updated version of said portion of the hearing device firmware; and
g) loading an updated version of at least a portion of not-yet updated hearing device firmware into said hearing device via said wireless communication link.

In one embodiment, step e) is carried out after steps f) and g) have been carried out.

In one embodiment, said portion of not-yet updated hearing device firmware is all not-yet updated hearing device firmware for the hearing device.

In one embodiment, subsequent to steps g) and f), the data loaded into said hearing device in step g) are installed in said hearing device using said wireless communication link. More particularly, via said wireless communication link, an update application executed in a processor external to the hearing device will install said loaded updated version.

In one embodiment, both, the original and the updated version of said portion of the hearing device firmware is comprised in said memory unit during step a). This can contribute to the safety of the update process.

In one embodiment, the method comprises, after step a), the step of h) storing in said memory unit indicative data, if said portion of said hearing device firmware has been successfully installed (in step a);

and furthermore the steps of i) checking whether or not said indicative data are stored in said memory unit;
j) if said indicative data are not stored in said memory unit: attempting to carry out step a) again.

This can contribute to the safety of the update process. E.g., if a power interruption (battery becomes empty or battery is changed) would occur during step a), said indicative data would not be stored in said memory unit, so that later, another attempt would be made to carry out step a).

In one embodiment, step i) is carried out after an initialization of the hearing device and/or upon startup of the hearing device.

In one embodiment, a flag is set as said indicative data.

In one embodiment, if said checking mentioned in step i) has a positive result (indicative data are stored in said memory unit) said updated version of said portion of the hearing device firmware will be used in further steps of the method. E.g., if the "wireless firmware" has been updated in step a), further data transmission and/or updating steps can and usually also will make use of wireless communication connections using the updated "wireless firmware".

In one embodiment in which both, the original and the updated version of said portion of the hearing device firmware is comprised in said memory unit during step a), data descriptive of a location where in said memory unit said updated version of said portion of the hearing device firmware is comprised in said memory unit is stored are written into said memory unit. This writing of these data descriptive of said memory location can be carried out by said update application.

In one embodiment, said hearing device comprises a communication interface for communication via a wireless communication link, and said method comprises, before step a), the step of k) checking whether or not an update is required of that portion of the hearing device firmware which is required for or related to said communication via said wireless communication link ("wireless firmware"); and
l) carrying out step a) only if the result of the checking mentioned in step k) is positive.

This embodiment can help to simplify the updating process in the following way: If the result of the checking mentioned in step k) is negative, i.e. the "wireless firmware" currently installed in the hearing device does not have to be changed, i.e. does not undergo a change in the update to the new (complete) firmware version, the "wireless firmware" can be left unchanged, and it is possible to proceed, e.g., in the way known it the art by using an externally-executed update application via the wireless communication link. Accordingly, the update process can be simplified.

In one embodiment, the hearing device comprises two or more modules which are operationally interconnected. Examples of such modules are described, e.g., in DE 102 005 006 404 B3. In one such embodiment, said portion of said hearing device firmware mentioned in step a) is a portion of the firmware related to or required for the operation of one or more of said modules, in particular less than all of said modules.

In one embodiment, the hearing device comprises a detachable module, and said portion of said hearing device firmware is related to or required for operating said detachable module.

In one embodiment, if said module is a detachable module. in particular a detachable transceiver (e.g., an RF transceiver, such as a detachably connectable FM shoe), step a) can refer—in full or in part—to a firmware portion required for the operation of this detachable module.

The system according to the invention is a system for updating the firmware of a programmable hearing device comprising at least one processor, a memory unit in which hearing device firmware is stored and a communication interface for communication via a wireless communication link. The system comprises an update apparatus comprising a communication interface for communication via a wireless communication link and a storage unit in which an update application is stored, which update application is designed to be executed in said processor. Said update application is an application for installing an updated version of at least a portion of the hearing device firmware in said memory unit.

In one embodiment, said update apparatus is an apparatus separate from said hearing device.

In one embodiment, said update apparatus is a fitting apparatus, i.e. an apparatus used for fitting hearing devices.

In one embodiment of the system, said update apparatus is configured to transmit said update application to said hearing device via said wireless communication link.

In one embodiment of the system, said update apparatus comprises an update device comprising said communication interface of the update apparatus, and an update station operationally connectable to said update device.

Said update station typically is or comprises a computer such as a personal computer.

In one embodiment, said update station is a fitting station used for fitting hearing devices.

In one embodiment, said update device is a device separate from said hearing device.

In one embodiment, said update device is a fitting device.

In one embodiment, said update device is a device to be worn by hearing device user, usually in a distance to the hearing device user's ears, e.g., at his neck, e.g., using a chain.

Said operational connection between said update station and said update device can, e.g., be a wireless connection or can be wired.

In one embodiment, the system comprises said hearing device, and said hearing device comprises no socket or plug for electrically connecting the hearing device. This electrically connecting is meant in the sense of physically/galvanically connecting the hearing device. A wireless connection is not considered a type of electrical connection.

Accordingly, in this embodiment, there is no provision for electrically (galvanically) connecting the hearing device.

Accordingly, in this embodiment, there is no provision for a wired connection to hearing device. This allows to save a considerable amount of space in the hearing device, which is very valuable.

The hearing device according to the invention comprises at least one processor, a memory unit in which hearing device firmware is stored and a communication interface for communication via a wireless communication link, wherein at least a portion of that portion of the firmware which is required for or related to said communication via said wireless communication link is stored in writable non-volatile memory in said memory unit and is updateable by means of an update application that is executable in said processor.

In one embodiment, said hearing device comprises no socket or plug for electrically connecting the hearing device. Such a hearing device has already been discussed above.

The computer program product according to the invention comprises program code for causing a computer comprising a communication interface for communication via a wireless communication link to perform the steps of
- P) establishing said wireless communication link with a hearing device comprising a communication interface for communication via a wireless communication link, a processor and a memory unit;
- Q) loading an update application executable in said processor into said hearing device via said wireless communication link;

wherein said update application is designed to install an updated version of at least a portion of the hearing device firmware in said memory unit.

In one embodiment of the computer program product, said program code is adapted to causing said computer to perform the step of
- R) loading said updated version of said portion of the hearing device firmware into said hearing device via said wireless communication link.

Further possible properties of the computer program product emerge immediately from the method described above.

In one embodiment of the computer program product, said program code is adapted to causing said computer to perform the step of allowing a user of the computer to amend signal processing parameters of the hearing device, more particularly to adapt the hearing device's signal processing parameters to the hearing device user's hearing needs and preferences.

The software executing in the update apparatus for updating the hearing device firmware can also be the software for adapting the hearing device's signal processing parameters to the hearing device user's hearing needs and preferences. In other words, a hearing device fitting software can be used for controlling steps of the firmware updating process.

The computer-readable medium according to the invention comprises program code as put forward in conjunction with the computer program product according to the invention.

The invention comprises systems and hearing devices as well as computer program products and computer-readable media with features of corresponding methods according to the invention, and vice versa. The advantages of these correspond to the advantages of corresponding methods and vice versa.

Further embodiments and advantages emerge from the dependent claims and the figures.

BRIEF DESCRIPTION OF THE DRAWINGS

Below, the invention is described in more detail by means of examples and the included drawings. The figures show.

The reference symbols used in the figures and their meaning are summarized in the list of reference symbols. The described embodiments are meant as examples and shall not confine the invention.

DETAILED DESCRIPTION OF THE INVENTION

Figure 1:
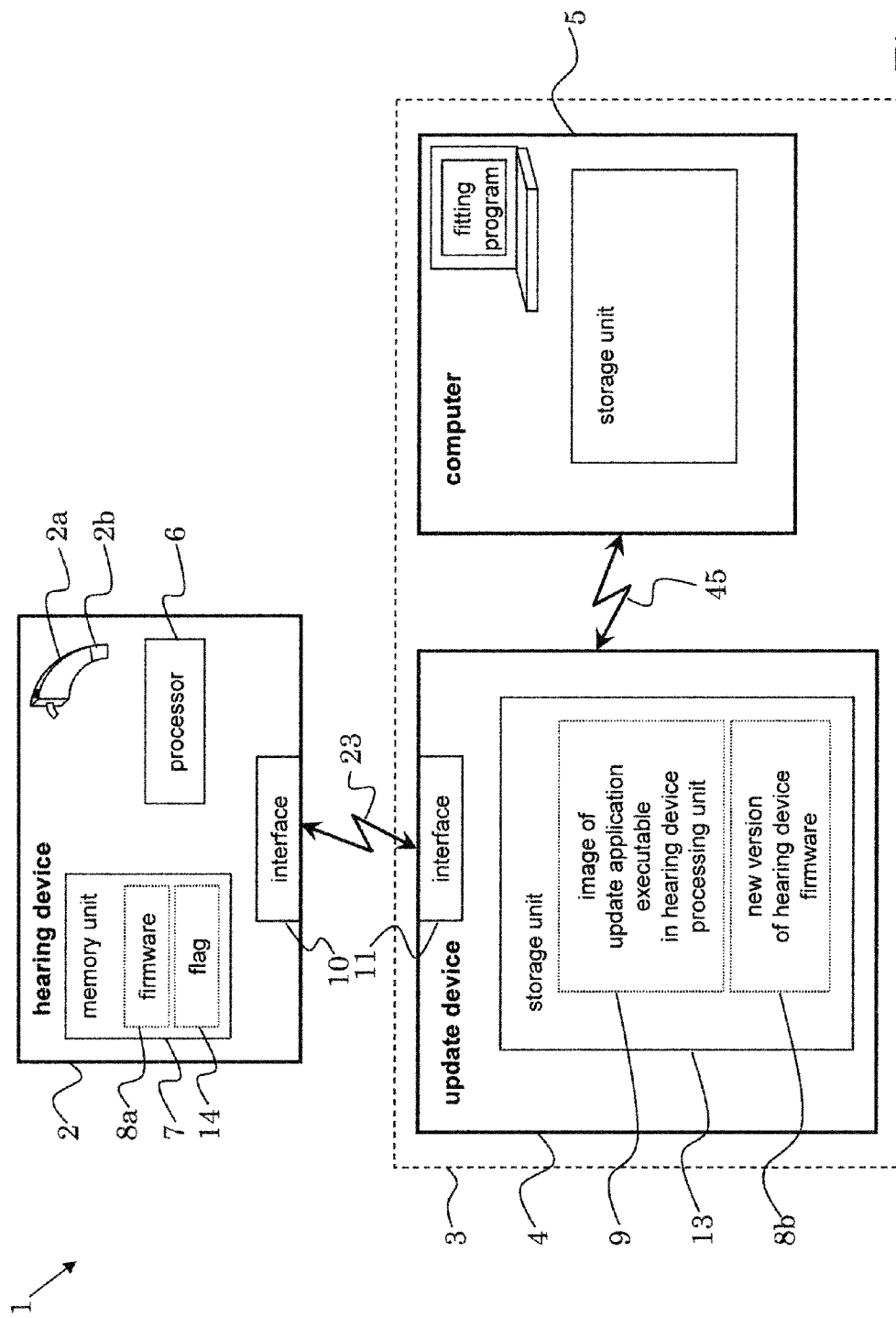
FIG. 1 a block diagrammatical illustration of a system according to the invention.

FIG. 1 shows a block diagrammatical illustration of a system 1 according to the invention. System 1 is a system for updating the firmware 8a of a programmable hearing device 2. The hearing device 2 can be comprised in the system 1. The system 1 comprises an update apparatus 3, which comprises an update device 4 and an update station 5 such as a computer. Update device 4 and update station 5 are operationally interconnected in a wired or in a wireless way (see 45). The update device 4 is a fitting device 4 which is also used during fitting of the hearing device 2; it can be worn around the neck of a user of the hearing device 2 and comprises a communication interface 11 by means of which it communicates via a communication link 23 with the hearing device 2 comprising a communication interface 10 for that purpose, and a storage unit 13. Storage unit 13 can alternatively be comprised in update station 5, or can be distributed among update device 4 and update station 5.

In particular in the case that storage unit 13 is comprised in update station 5, update device 4 can accomplish the task of a relay station between update station 5 and hearing device 2 in the communication between update apparatus 3 and hearing device 2: information transmitted from update station 5 via a communication link 45 to update device 4 will be—possibly after some transformation—transmitted from update device 4 via communication link 23 to hearing device 2. Communication link 45 can use a communication channel different from the communication channel used by communication link 23. This is particularly useful if the communication range of communication link 45 (e.g., several meters) is larger than the communication range of communication link 23 (e.g., below 2 m or below 1 m).

The storage unit 13 is external to (separate from) the hearing device 2 and comprises a new version 8b of the hearing device firmware and an update application 9 which is executable in hearing device 2, more precisely in a processor 6 of hearing device 2.

Hearing device 2 comprises furthermore a memory unit 7, typically non-volatile memory, in which an original version 8a of the hearing device firmware is stored and possibly also indicative data 14 such as a flag or—not indicated in FIG. 1—data descriptive of a memory location as will be discussed below. Hearing device 2 can be composed of two or more modules 2a,2b such as a basic hearing device 2a and a detachable radiofrequency module 2b, which, e.g., can comprise interface 10.

It is to be noted that update apparatus 3 can be composed, e.g., solely of update device 4 or solely of update station 5.

FIG. 1 illustrates one possible embodiment of the system 1. Of interest with respect to the invention, however, are also other systems, by means of which the method according to the invention can be carried out.

Figure 2:
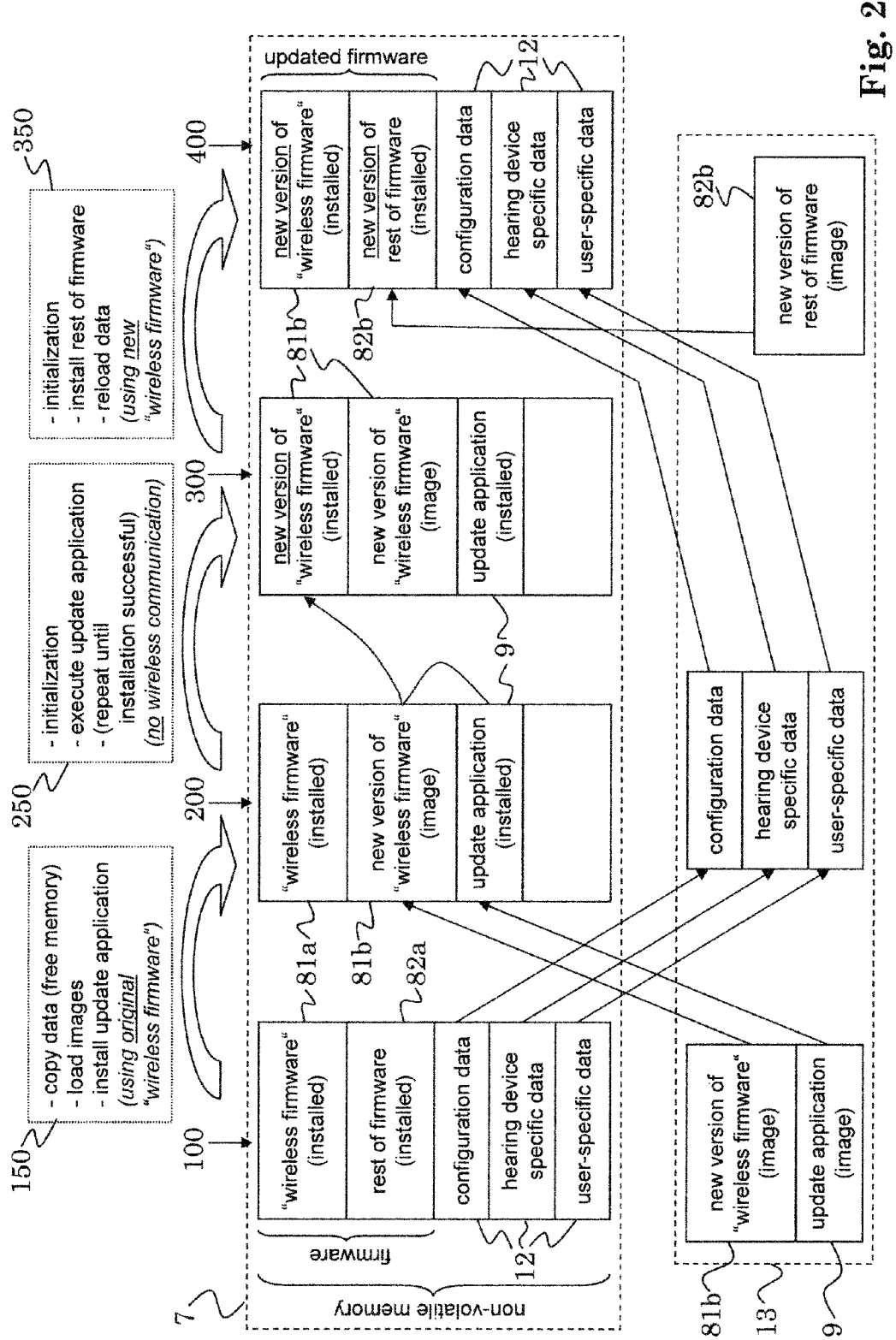
FIG. 2 a schematic illustration of a method according to the invention.

FIG. 2 shows a schematic illustration of a method according to the invention. While describing the method illustrated in FIG. 2, it will sometimes be referred back also to FIG. 1, since the system 1 of FIG. 1 can be used for carrying out the method illustrated in FIG. 2.

The method illustrated in FIG. 2 allows, in a multi-step process, to update the firmware of a hearing device 2 with wireless communication capabilities in a fully wireless fashion and to include also that portion 81*a* of the firmware 8*a* which is required for said wireless communication. This allows to provide the hearing device with improvements of its wireless capabilities in a purely wireless way, i.e. without electrically (galvanically) contacting the hearing device (more precisely: the hearing device electronics). Accordingly, it is possible to provide a fully upgradeable hearing device 2 which does not have a plug or socket. Those data required for said communication via said wireless communication link 23 can be considered basic wireless-enabling data and will be referred to as "wireless firmware". The "wireless firmware" can be or comprise a protocol stack, more precisely the protocol stack for wireless communication (wireless protocol stack).

In the middle portion of FIG. 2, the contents of memory unit 7 or of at least a portion of the hearing device's non-volatile memory is illustrated in four different states 100, 200, 300, 400 for illustrating the updating procedure. In the upper portion of FIG. 2, it is depicted, what happened from one state to the next state (steps 150, 250, 350). In the lower portion of FIG. 2, the contents of storage unit 13 is illustrated. The thin arrows illustrate some developments that take place from one state to the next state.

In state 100, an original version 8*a* of the hearing device firmware is stored in memory unit 7, comprising the original "wireless firmware" 81*a* and the rest 82*a* of the original firmware. Furthermore, data 12 are comprised in memory unit 7, such as user-specific data, hearing device specific data and configuration data.

From state 100 to 200, i.e. during step 150, the wireless capabilities of hearing device 2 as given by the original "wireless firmware" 81*a* are used, and communication link 23 between hearing device 2 and update apparatus 3 is established. Using communication link 23, firstly memory space is freed by copying data 12 to external storage unit 13. Since the rest 82*a* of the original firmware can be dispensed with, the corresponding memory space can be overwritten. Then, a new version 81*b* of the "wireless firmware" and update application 9 are written into memory unit 7, and update application 9 is also installed, i.e. prepared to be executable in processor 6. Note that the original "wireless firmware" 81*a* may not be overwritten, since it is in function during the copying/loading processes.

Step 150 is controlled by an update application executable in update apparatus 3, e.g. by a fitting software. This update application executable in update apparatus 3 may not be confused with the update application 9 executable in the processor 6 of the hearing device 2.

Then, hearing device 2 is initialized, e.g., by restarting it. (This is also still controlled by said update application executable in update apparatus 3, but might alternatively be controlled by the update application 9 executable in the processor 6 of the hearing device 2). During step 250, hearing device 2 does not function as a hearing device anymore, it does not have major parts of its firmware anymore. Furthermore, during step 250, hearing device 2 does not need a connection to the outside, it does not have a wireless communication connection and neither needs a wired communication connection.

Upon said initialization, update application 9 will start in processor 6 and install the new version 81*b* of the "wireless firmware". The original version 81*a* of the "wireless firmware" will thereby be overwritten (replaced). If the installation has been successful, e.g., verified by calculating a checksum or simply by reaching that point in the update application, flag 14 will be set, and the hearing device 2 is initialized, e.g., by restarting it.

If, after this initialization, it is found that flag 14 is not set, update application 9 will again try to accomplish the installation of the new version 81*b* of the "wireless firmware". This will be repeated until state 300 is reached.

If, after this initialization, it is found that flag 14 is set, i.e. it is indicated that the update has been successfully completed, communication link 23 will be established (using the new version 81*b* of the "wireless firmware"), and further steps will be controlled by update apparatus 3 again, via communication link 23 (step 350).

The rest 82*b* of the new version of the firmware will be installed (an image thereof is available in update apparatus 3), and the data 12 will be restored in memory unit 7, too. State 400 is reached.

Note that in one embodiment it is possible—instead of overwriting (replacing) the original version 81*a* of the "wireless firmware" by the new version 81*b* of the "wireless firmware"—to store the new version 81*b* of the "wireless firmware" in a different place in memory unit 7 without (fully or partially) deleting the original version 81*a* of the "wireless firmware" and, in addition, to write into memory unit 7 data descriptive of a location where in memory unit 7 said new version 81*b* of the "wireless firmware" is stored. Writing these data (which are descriptive of said memory location) can in this embodiment be the main or even the only task carried out by update application 9; these data can, e.g., be read upon a startup of the hearing device in order to use the appropriate "wireless firmware". Storing the new version 81*b* of the "wireless firmware" in said different place in memory unit 7 can be carried out by or under control of the update application executable in update apparatus 3. Note further, that it is possible in this embodiment to overwrite the original version 81*a* of the "wireless firmware" in step 350 when installing the rest 82*b* of the new version of the firmware.

After another restart, the hearing device 2 will function again as a hearing device, with completely updated firmware 8*b*.

Please note that the invention as described above allows to minimizes the storage space required in hearing device 2. If storage space in a hearing device were not scarce, the copying of data 12 to storage unit 13 and the overwriting of data could be dispensed with. And furthermore, it would even be possible to dispense with step 350, since the complete new firmware version 8*b* (81*b* and 82*b*) could be loaded into hearing device 2 during step 150, and update application 9 could be so comprehensive that it would install the complete new firmware version 8*b* (81*b* and 82*b*).

The possibility of carrying out a firmware update in a fully wireless fashion makes the firmware update easier and more comfortable. The possibility of including the "wireless firmware" in a firmware update allows to implement technical progress in wireless communication in hearing devices while greatly reducing testing. As known to everybody knowledgeable in the field of hearing-aid devices, strong testing requirements have to be conformed with, which results in considerable investments in time and money to accomplish. The invention allows to reduce the amount of testing by reducing the amount of possible version combinations, since only one sole version for a complete hearing device firmware has to be taken care of, whereas otherwise all possible combinations of "wireless firmware" versions and versions of the rest of the firmware would have to be taken care of (unless the "wireless firmware" would never be changed).

An embodiment with the following steps can be particularly valuable if the new wireless communication protocols (of the new "wireless firmware") are not compatible with the original wireless communication protocols (of the original "wireless firmware"): Whereas during step 150, the original wireless communication protocols are used, e.g., by update device 4 having a compatible update device firmware, during step 350, a new update device firmware would have to be used in order to be able to communicate with the hearing device in state 400; and this is accomplished by carrying out a corresponding update process of the firmware of the update device 4. Preferably, this is carried out while the "wireless firmware" of the hearing device 2 is updated, i.e. during step 250. These two update processes can be carried out concurrently, which saves time.

The updating of the update device firmware may be accomplished using update station 5 and communication link 45. The update of the update device firmware can be accomplished in a simple way, controlled by an update application running in the update station 5. Carrying out the update of the firmware of update device 4 in a way analog to the way described in FIG. 2 for the hearing device firmware is possible, but usually not required.

Some aspects of the embodiments have been described in terms of functional units. As is readily understood, these functional units may be realized in virtually any number of hardware and/or software components adapted to performing the specified functions. For example, memory unit 7 may be distributed among several memory chips, and storage unit 13 may be distributed among several storage devices such as hard disks, memory chips.

LIST OF REFERENCE SYMBOLS 1 system
2 hearing device
2a module of hearing device
2b module of hearing device
3 update apparatus
4 update device, fitting device
5 update station, fitting station, personal computer
6 processor
7 memory unit, non-volatile memory
8a original firmware
8b new firmware
81a original "wireless firmware"
81b new "wireless firmware"
82a original rest of firmware
82b new rest of firmware
9 update application
10 communication interface
11 communication interface
12 data
13 storage unit
14 indicative data
23 communication link
45 communication link 100,200,300,400 states
150,250,350 steps

The invention claimed is:

1. A method of manufacturing a firmware-updated programmable hearing device comprising at least one processor and a memory unit in which hearing device firmware is stored, said hearing device further comprising a communication interface for communication via a wireless communication link, and wherein a portion of the hearing device firmware is wireless firmware comprising a protocol stack for said communication via said wireless communication link, said method comprising the steps of
   d) copying data stored in said memory unit to an external storage unit; and subsequently
   b) loading an update application, not currently stored in said hearing device, into said hearing device via said wireless communication link;
   a) executing the update application in said processor thereby installing an updated version of said wireless firmware comprising said protocol stack in said memory unit; and subsequently
   f) establishing said wireless communication link using said updated version of said wireless firmware comprising said protocol stack;
   g) loading an updated version of at least a portion of not-yet updated hearing device firmware into said hearing device via said wireless communication link; and
   e) loading at least part of said data stored in said external storage unit back into said memory unit.

2. The method according to claim 1, said method further comprising, before step a), the step of
   c) loading said updated version of said wireless firmware comprising said protocol stack for said communication via said wireless communication link into said hearing device via said wireless communication link.

3. The method according to claim 1, wherein both, an original and the updated version of said wireless firmware comprising said protocol stack for said communication via said wireless communication link are comprised in said memory unit during step a).

4. The method according to claim 3, comprising, after step a), the step of
   h) storing in said memory unit indicative data, if said wireless firmware comprising said protocol stack for said communication via said wireless communication link has been successfully installed;
   and comprising the steps of
   i) checking whether or not said indicative data are stored in said memory unit;
   j) if said indicative data are not stored in said memory unit: attempting to carry out step a) again.

5. The method according to claim 1, said method comprising, before step a), the step of
   k) checking whether or not an update is required of said wireless firmware comprising said protocol stack for said communication via said wireless communication link; and
   l) carrying out step a) only if the result of the checking mentioned in step k) is positive.

6. The method according to claim 1, wherein the hearing device comprises a detachable module, and wherein said wireless firmware comprising said protocol stack for said communication via said wireless communication link is related to or required for the operation of said detachable module.

7. A system for updating firmware of a programmable hearing device comprising at least one processor, a memory unit in which hearing device firmware is stored and a communication interface for communication via a wireless communication link, said system comprising an update apparatus comprising a communication interface for communication via said wireless communication link and a storage unit in which an update application is stored, which update application is loaded into the memory unit of the hearing device from the update apparatus when not currently stored in the hearing device, and the update application is designed to be executed in said processor installing an updated version of at least a portion of the hearing device firmware in said memory unit, wherein the portion of the hearing device firmware is wireless firmware comprising a protocol stack for said communication via said wireless communication link, wherein data stored in said memory unit is copied to the storage unit of the update apparatus before the update application is executed in said processor, and after the update application is executed in said processor, said wireless communication link is established between the hearing device and the update apparatus using said updated version of said wireless firmware comprising said protocol stack for said communication via said wireless communication link, and then the update apparatus loads an updated version of at least a portion of not-yet updated hearing device firmware into said hearing device via said wireless communication link and further loads at least part of said data copied to said external storage unit back into said memory unit.

8. The system according to claim 7, wherein said update apparatus comprises an update device comprising said communication interface of the update apparatus and an update station operationally connectable to said update device.

9. The system according to claim 7 or claim 8, wherein the system comprises said hearing device, and wherein said hearing device comprises no socket or plug for electrically connecting the hearing device.

10. A hearing device comprising at least one processor, a memory unit in which hearing device firmware is stored and a communication interface for communication via a wireless communication link, wherein at least a portion of the hearing device firmware which is wireless firmware comprising a protocol stack for said communication via said wireless communication link is stored in writable non-volatile memory in said memory unit and is updateable by means of an update application that is loaded into the memory unit, when not currently stored in the memory unit, as part of a hearing device firmware update process, wherein the update application is executable in said processor,
wherein the hearing device is configured to copy data stored said memory unit to an external storage unit before executing said update application, and then execute said update application thereby installing an updated version of said wireless firmware comprising a protocol stack in said memory unit, and then establish said wireless communication link using said updated version of said wireless firmware comprising a protocol stack, and subsequently load an updated version of at least a portion of not-yet updated hearing device firmware into said hearing device via said wireless communication link and further load at least part of said data stored in said external storage unit back into said memory unit.

11. A non-transitory computer readable medium encoded with a computer program comprising program code for causing a computer comprising a communication interface for communication via a wireless communication link to perform the steps of establishing said wireless communication link with a hearing device comprising a communication interface for communication via a wireless communication link, a processor and a memory unit;

loading an update application executable in said processor and not currently stored in said hearing device into said hearing device via said wireless communication link, wherein said update application is designed to install an updated version of at least a portion of a hearing device firmware in said memory unit, wherein said portion of the hearing device firmware is wireless firmware comprising a protocol stack for said communication via said wireless communication link;

receiving and storing data from said memory unit of said hearing device; and subsequently loading said updated version of said wireless firmware comprising said protocol stack into said hearing device via said wireless communication link; and subsequently loading an updated version of at least a portion of not-yet updated hearing device firmware into said hearing device via said wireless communication link; and loading at least part of said data back into said memory unit.

12. The method according to claim 1, wherein said data stored in said external storage unit comprises data required for operating the hearing device as a hearing device.

* * * * *

UNITED STATES PATENT AND TRADEMARK OFFICE
CERTIFICATE OF CORRECTION

PATENT NO. : 8,712,082 B2  Page 1 of 1
APPLICATION NO. : 13/120204
DATED : April 29, 2014
INVENTOR(S) : Spieler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 123 days.

Signed and Sealed this
Twenty-ninth Day of September, 2015

Michelle K. Lee
*Director of the United States Patent and Trademark Office*